UNITED STATES PATENT OFFICE.

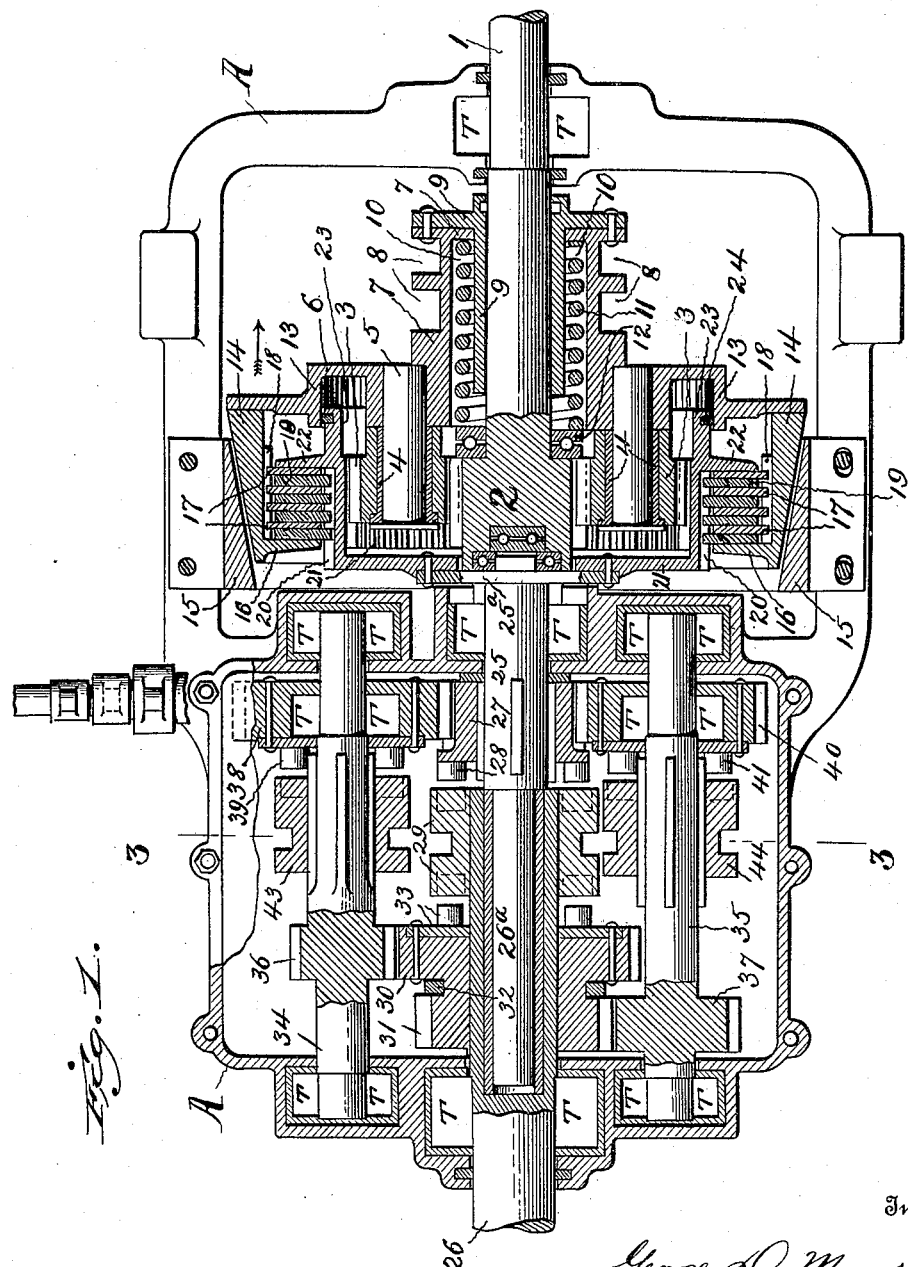

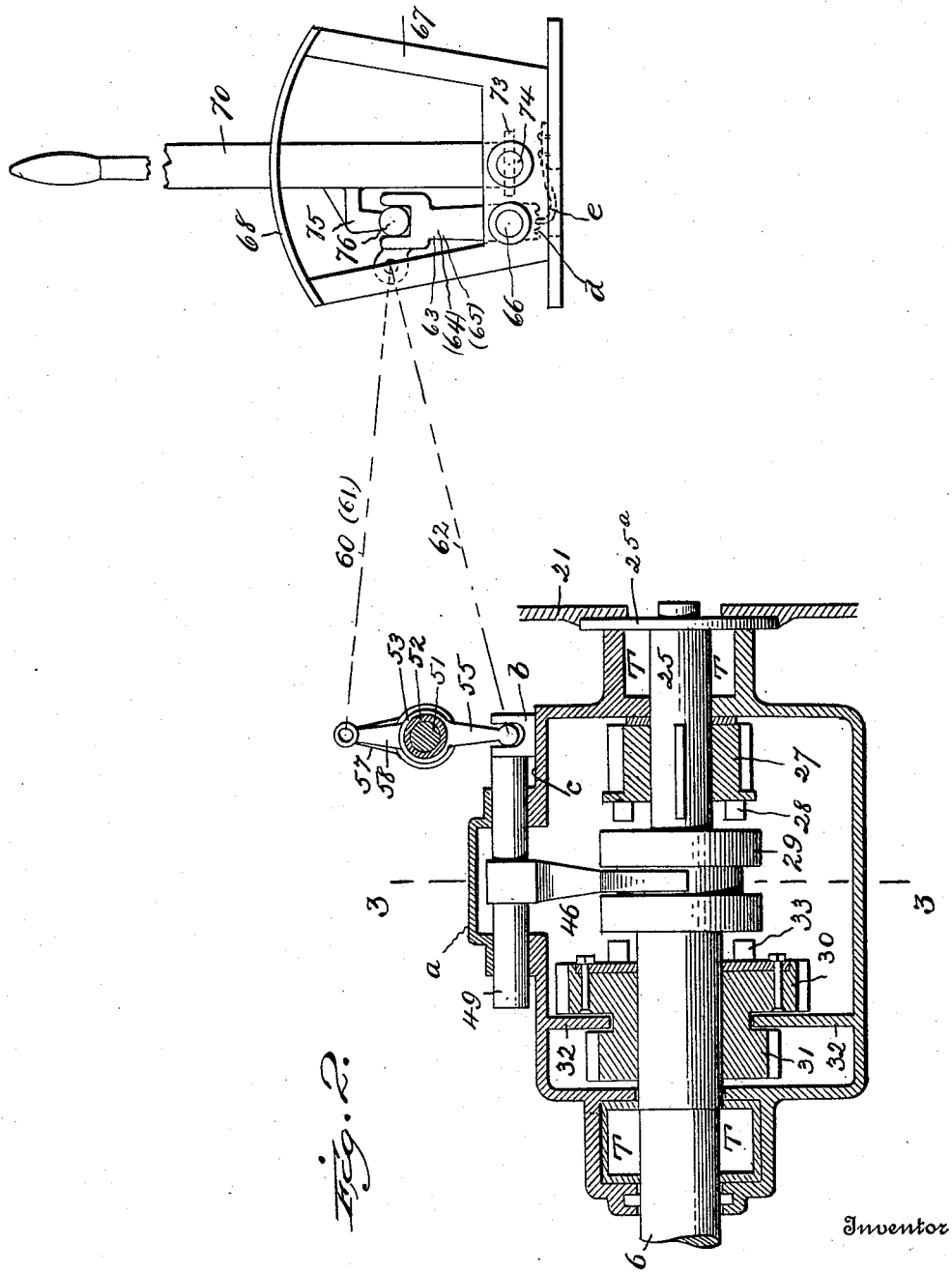

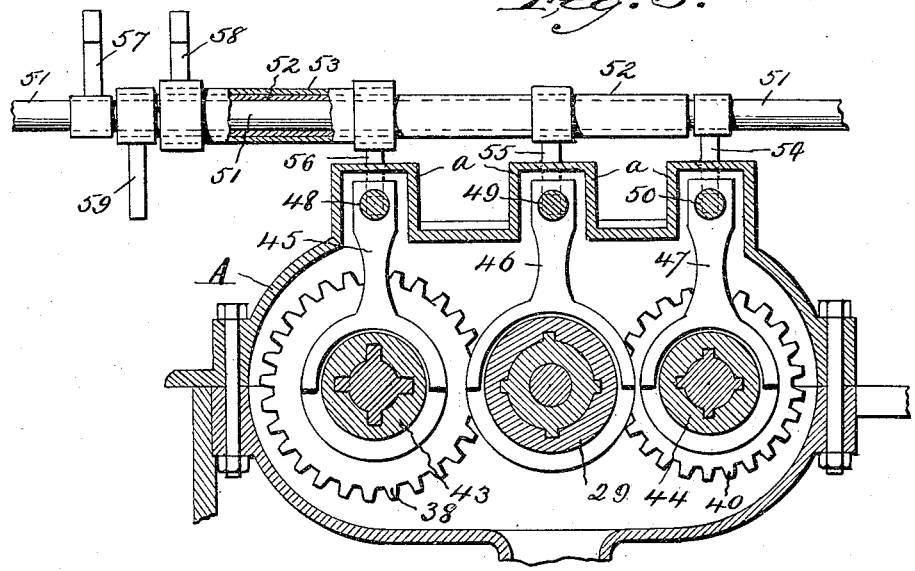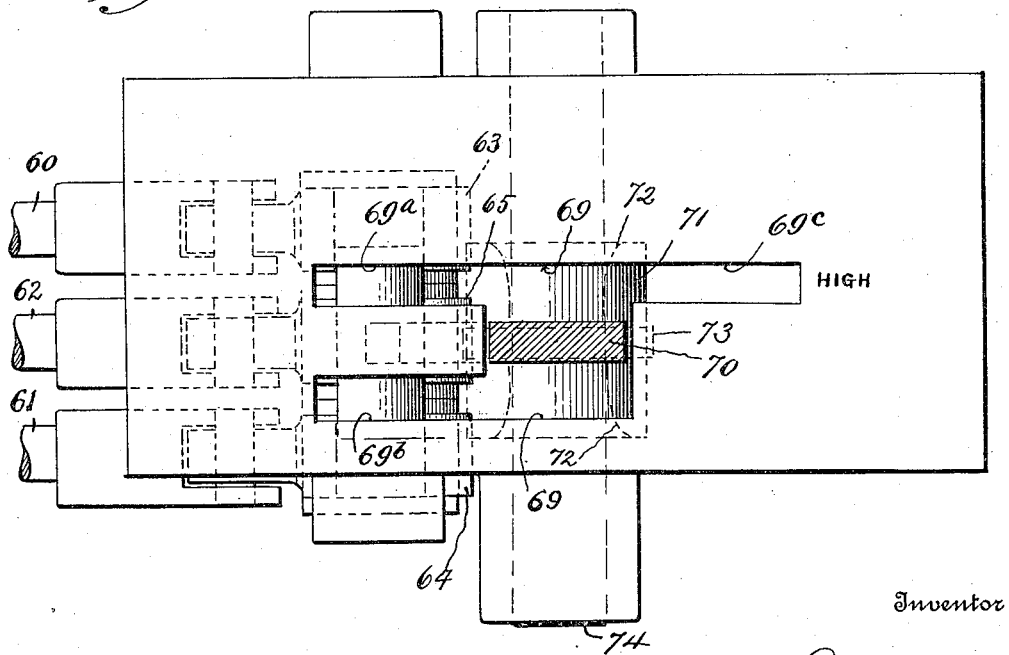

GEORGE D. MUNSING, OF NEW YORK, N. Y., ASSIGNOR TO GEORGE D. MUNSING AND CHARLES E. INGERSOLL, BOTH OF NEW YORK, N. Y., COPARTNERS DOING BUSINESS AS MUNSING AND INGERSOLL.

SPEED-CHANGING MECHANISM.

1,151,897.  Specification of Letters Patent.  Patented Aug. 31, 1915.

Application filed September 11, 1912.  Serial No. 719,840.

*To all whom it may concern:*

Be it known that I, GEORGE D. MUNSING, a citizen of the United States of America, residing at New York, in the county and State of New York, have invented certain new and useful Improvements in Speed-Changing Mechanism; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to speed changing mechanism, and has for its object simple and efficient mechanism whereby a motor vehicle may be given a number of different speeds, and each of these speeds may be varied or reversed during the operation of the vehicle.

Referring to the drawings, in which like parts are similarly designated—Figure 1 is a horizontal section of one form of speed changing mechanism embodying my invention. Fig. 2 is an elevation, partly in section, showing means for shifting the clutch members for obtaining different speeds. Fig. 3 is a transverse section, taken substantially on the line 3—3 of Figs. 1 and 2. Fig. 4 is a plan view of a shifting lever controlling plate.

The engine of the motor vehicle is connected to shaft 1, which is provided at its end with a driving pinion 2. This pinion 2 gears with planet gear wheels 3. The planet gear wheels 3 are mounted on bushings 4 on pins 5 held in a spider or carrier 6, and this spider or carrier 6 is provided with a sleeve portion 7 in which are grooves 8 for the engagement of a shifting fork, not shown, for shifting the carrier axially of shaft 1.

Within the sleeve 7, spaced therefrom and secured thereto is a concentric sleeve 9 on the shaft 1, and carried in the annular space 10 between sleeves 7 and 9 is a coil spring 11, one end of which bears against a thrust bearing 12 located on shaft 1 between the ends of spring 11 and pinion 2, and the other end of the spring bears against the end of sleeve 7. The spider or carrier 6 is also provided with an annular wall or flange 13, perpendicular thereto, for purposes hereinafter explained, and carries one conical member 14 of a cone clutch. This conical member 14 is arranged to coöperate with a stationary conical member 15 secured to the frame A of the speed changing mechanism.

The cone 14 is provided with an inwardly directed flange 16 which forms the compressing member of a friction clutch, which clutch consists of a set of annular plates 17 having notches on their external periphery that engage ridges or keys 18 on the inner cylindrical face of the cone member 14. Coöperating with the plates 17 is a similar set of friction plates 19 provided with notches on their internal periphery that engage ridges or keys 20 on the external periphery of an internal gear wheel 21, said internal gear wheel gearing with the planet wheels 3.

This internal gear wheel is also provided with a flange 22, operates as an abutment for the friction plates, and is arranged to coöperate with the flange 16. Between these flanges the plates 17 and 19, are compressed and held. Extending from the internal gear wheel 21 is a flange 23, between which and the portion 13 of the spider or carrier is placed a packing 24, the object of which is to prevent the grease for lubricating the pinions 3 and sleeve 9 from reaching the friction plates.

The internal gear wheel 21 is secured to a flange 25$^a$ on the end of a shaft 25, which latter is in alinement with the driving shaft 1, the two shafts having one or more thrust bearings placed between them.

The shaft 25 has a reduced portion 26$^a$ that enters a socket in the end of the alined transmission shaft 26. Keyed on shaft 25 is a pinion 27 having clutch teeth 28. Slidable, but not rotatable, on the shaft 26 is a clutch member 29, and adjacent the clutch member 29 on shaft 26 is a loose double gear wheel 30, 31, there being a groove between the wheels 30 and 31 for the reception of flanges 32 on the casing or frame A and best illustrated in Fig. 2. These flanges prevent axial movement of the double gear wheel. Secured to the face of gear 30 is a clutch member 33, so that the sliding clutch member 29 may be axially moved into engagement with either 28 or 33.

Parallel to the shafts 25, 26 are counter shafts 34, and 35 respectively, one on each side of said shafts 25, 26. Secured to or integral with shaft 34 is a pinion 36 that gears with the larger gear wheel 30 of the double gear wheel, and on the shaft 35 is a gear wheel 37 that gears with the smaller gear wheel 31 of the double gear wheel.

On the counter shaft 34 is loosely mounted a gear wheel 38 which is provided with a clutch face 39, said gear wheel gearing with the pinion 27. A similar loose gear wheel 40 is on the counter shaft 35, and is also provided with clutch face 41. On counter shaft 34 is a clutch member 43, slidable but not rotatable thereon, operating to clutch the gear wheel 38 to shaft 34, and on counter shaft 35 is a similar clutch member 44, slidable but not rotatable thereon, and operating to clutch gear wheel 40 to said shaft 35. Each of the clutch members, 29, 43 and 44 is provided with a groove for the reception of the shifting forks 45, 46 and 47, respectively (Fig. 3), the structure of all three of which is identical.

The shifting forks are rigidly secured to rods 48, 49 and 50, respectively, slidable and having bearing in the top $a$ of the casing A (Figs. 2 and 3), and each rod 48, 49 and 50 is provided at one end with a fork $b$ slidable on the machined surface $c$ of the casing. Across the ends of rods 48, 49 and 50 are concentric shafts 51, 52 and 53, provided with depending levers 54, 55 and 56, respectively, and two of the shafts 51 and 53 are provided at one end with upwardly directed levers 57 and 58 respectively, and the shaft 52 is provided with a downwardly directed lever 59.

The several levers 57, 58 and 59 are connected respectively by rods, indicated at 60, 61 and 62 (Fig. 4) to similar forks 63, 64, 65, having a pivot 66, (Fig. 2) common to all of them. These forks are mounted in a sector frame 67 that is located near the seat of the operator of the vehicle, and has a top plate 68 provided with a slot or opening 69 of a configuration such as shown in Fig. 4, that is to say, there are parallel slots $69^a$ and $69^b$, and a slot $69^c$ in alinement with and opposite to $69^a$.

The operating lever 70 has a boss 71 at its lower end provided with a perforation flared at both ends, as indicated in dotted lines at 72, Fig. 4. A pin 73 passes through the middle of the boss and secures it to a pivot shaft 74. Secured to hand lever 70 above its pivot point 74, is a downwardly directed bracket 75 having a short cylindrical end 76 arranged to lie in the forks 63, 64 and 65. The length of this cylindrical portion 76 is somewhat greater than the distance between two forks, so that when the lever 70 is swung laterally on its pivot pin 73 from the position shown in Fig. 4, to either side thereof, the portion 76 will always engage two forks, and one of these forks will always be the fork 65 controlling the middle clutch 29.

Each side fork, 63 and 64 is provided at its bottom with a number of serrations $d$ Fig. 2, and engaging the serrations of each fork is the up-turned end of a leaf spring $e$ the object of which is to prevent the accidental movement of forks 63 and 64. The middle fork, 65, which is always in engagement with the lever, needs no such spring.

The operation will be as follows: The spider or carrier 6 is moved in the direction of the arrow (Fig. 1) by suitable or well known mechanism engaging grooves 8; that is to say the clutch lever is moved from its neutral to clutching position. The spring 11 will cause the carrier 6 to move in the direction of the arrow (Fig. 1) thus carrying with it the cone member 14, causing flange 16 to compress the plates 17, 19, against the flange 22 of the internal gear wheel 21, thereby clutching said gear wheel 21, cone member 14 and spider 6 together and preventing relative rotation of 21 and 6. If the clutching pressure is sufficient to lock the parts together, the speed of shaft 1 will then be transmitted to the internal gear wheel 21, the shaft 25 to which said gear wheel is connected, and the pinion 27, so that said pinion will rotate at the same speed as shaft 1. This pinion transmits its motion of rotation to the idle gear wheels 38 and 40 simultaneously, and the car is ready to start in the forward direction upon manipulation of the lever 70 from its neutral position, shown in Figs. 2 and 4. If the lever 70 is rocked laterally on its pivot 73, (its flared bore 72 permitting of this,) so as to be in alinement with slot $69^b$, Fig. 4, the cylindrical portion 76 of the lever will be shifted so as to be in engagement with the forks 64 and 65. The lever is then shoved forward in the slot $69^b$. The two forks 64 and 65 are then moved forward, operating rods 61 and 62 and levers 58 and 59 in opposite directions to rotate shafts 52 and 53 and thereby sliding rods 48 and 49 and clutch forks 45 and 46 to operate the clutch members 29 and 43 in opposite directions. This causes clutch member 43 (Fig. 1) to engage 39, and the clutch member 29 to engage 33, whereby the lowest speed will be obtained from pinion 27, gear wheel 38, clutch member 43, gear wheel 36, gear wheel 30, clutch members 33 and 29 and shaft 26. It is preferable, but not absolutely necessary that the clutch teeth 33 be slightly shorter than the clutch teeth 39 or 41, so that the clutches 43 and 44 will connect slightly in advance of clutches 29 and 33. If the lever 70 is now moved to the opposite side of the opening 69 in line with $69^a$ and $69^c$ the cylindrical portion 76 will leave clutch fork 64 and engage forks 63 and 65. If the lever is then shoved into slot 69ª, clutch member 44 will operate simultaneously with clutch member 29, preferably arranged to come into engagement in advance of clutches 29 and 33. This will give the intermediate or middle speed. By pulling lever 70 to the rear so as to enter slot 69ᶜ, clutch member 29 will be operated to engage the clutch face 28 on pinion 27. The clutch 44, having substantially double the extent of movement of clutch 43, is moved from its neutral position both forward and backward in order to permit the movement of clutch 29 from its neutral position both forward and backward.

Any of the speeds mentioned are reduced by releasing more or less the pressure on the friction plates 17 and 19, in which case there will be relative rotation between pinion 2 and the internal gear wheel 21'.

In order to reverse at any of the speeds mentioned, that is to say, at low speed, high speed or intermediate speed, the sleeve 7 (Fig. 1) is moved in a direction opposite to that indicated by the arrow, thereby releasing the friction plates and causing cone 14 to engage cone 15.

In order to permit movement of the planet wheel carrier 6, the faces of the internal gear wheel 21 and of the main driving pinion 22 are wider than the faces of the planet gear wheels 3, as will be clearly seen from an inspection of Fig. 1.

The shafts 1, 26, 34, 35, and gear wheels 38 and 40 are provided with boxes for the reception of suitable roller bearings indicated at T.

I claim—

1. A controlling device for change speed mechanism, comprising three bodily movable shifting elements, one of which is connected to a clutch member of the high gears, one to a clutch member of the low gears and one to a clutch member of the intermediate gears of the change speed mechanism, a rock shaft connected to each shifting element, a lever on the rock shaft of the high gears projecting in one direction, a lever on each rock shaft of the other gears projecting in the opposite direction to the high gear lever, an operating lever pivoted to swing in two directions, and means operated by the latter to move the high speed lever in one direction and one of the other levers in the opposite direction simultaneously, for the purpose specified.

2. A controlling device for change speed mechanism, comprising three bodily movable shifting elements, one of which is connected to a clutch member of the high gears, one to a clutch member of the low gears and one to a clutch member of the intermediate gears of the change speed mechanism, a rock shaft connected to each shifting element, a lever on the rock shaft of the high gears projecting in one direction, a lever on each rock shaft of the other gears, projecting in the opposite direction to and on each side of the high gear lever, an operating lever, pivoted to swing in two directions, and means operated by the latter to move the high speed lever in one direction and one of the other levers in the opposite direction simultaneously, for the purpose specified.

3. A controlling device for change speed mechanism, comprising three bodily movable shifting elements, one of which is connected to a clutch member of the high gears, one to a clutch member of the low gears, and one to a clutch member of the intermediate gears of the change speed mechanism, a rock shaft connected to each shifting element, a lever on the rock shaft of the high gears projecting in one direction, a lever on each rock shaft of the other gears projecting in the opposite direction to and on each side of the high gear lever, a pivoted fork connected to each of said levers, and an operating lever pivoted to swing in two directions at right angles and having a lug adapted to simultaneously engage two of said forks whereby the high speed lever and one of the other levers may be swung simultaneously in opposite directions, for the purpose specified.

In testimony that I claim the foregoing as my invention I have signed my name in presence of the subscribing witnesses.

GEORGE D. MUNSING.

Witnesses:
R. H. ALLEN,
JAMES H. WESTCOTT.

Copies of this patent may be obtained for five cents each, by addressing the "Commissioner of Patents, Washington, D. C."